(12) United States Patent
Froment et al.

(10) Patent No.: US 8,040,800 B2
(45) Date of Patent: Oct. 18, 2011

(54) METHOD FOR ADDRESS TRANSLATION DEVICE TRAVERSAL FOR SIP SIGNALING MESSAGES THROUGH TEMPORARY USE OF THE TCP TRANSPORT PROTOCOL

(75) Inventors: Thomas Froment, Longpont sur Orge (FR); Marius Lazar, St Remy l'Honore (FR)

(73) Assignee: Alcatel Lucent, Paris (FR)

( * ) Notice: Subject to any disclaimer, the term of this patent is extended or adjusted under 35 U.S.C. 154(b) by 91 days.

(21) Appl. No.: 12/285,755

(22) Filed: Oct. 14, 2008

(65) Prior Publication Data

US 2009/0103540 A1 Apr. 23, 2009

(30) Foreign Application Priority Data

Oct. 19, 2007 (FR) .................................. 07 58427

(51) Int. Cl.
*G06F 11/00* (2006.01)
(52) U.S. Cl. .................. 370/230; 370/392; 709/232
(58) Field of Classification Search .................. 370/392, 370/466
See application file for complete search history.

(56) References Cited

U.S. PATENT DOCUMENTS 7,617,337 B1 * 11/2009 Beck et al. ....................... 710/11
2007/0140159 A1 * 6/2007 Eronen et al. .................. 370/328

FOREIGN PATENT DOCUMENTS

EP 1 841 170 10/2007

OTHER PUBLICATIONS

Rosenberg "RFC 3261: SIP: Session Initiation Protocol" IETF Request for Comments, Jun. 2002:(Jun. 1, 2002), pp. 1-269 in view of Eronen (U.S. Patent Application 20070140159.*

Rosenberg et al.: "RFC 3261: SIP: Session Initiation Protocol." IETF Request for Comments. Jun. 1, 2002. pp. 1-269.
Egevang K. et al.: "RFC 1631—The IP Network Address Translator (NAT)" http://ww.ietf.org/rfc/rfc1631.txt. May 1, 1994.
Srisuresh P et al.: "RFC 3022—Traditional IP Network Translator (Traditional NAT)" http://kaizi.viagenie.qc.ca/ietf/rfc/rfc3022.txt. Jan. 1, 2003.
Senie D.: "RFC 3235—Network Address Translator (NAT)—Friendly Application Design Guidelines" Jan. 1, 2002.
French Search Report.
French Written Opinion.

* cited by examiner

*Primary Examiner* — Seema S. Rao
*Assistant Examiner* — Henry Baron
(74) *Attorney, Agent, or Firm* — Harness, Dickey & Pierce, P.L.C.

(57) ABSTRACT

A method for establishing a communication session between a first communication client located within a first communication network, and a second communication client, via a signaling server located within a second communication network distinct from the first communication network and connected thereto via a address translation device. The method includes the step of binding a first address and a second address of the first communication client within the address translation device, by having the first communication client transmit registration messages according to the UDP protocol to the communication server. The method further includes saving, at the communication server, an incoming signaling message sent from the second communication client and intended for the first communication client; replying, by the communication server, to the registration message of the first communication client that follows with a reply message requesting that the first communication client send a new registration message using the TCP protocol; and delivering, by the communication server, the incoming signaling message after the new registration message using the TCP protocol has been received from the first communication client.

12 Claims, 1 Drawing Sheet

METHOD FOR ADDRESS TRANSLATION DEVICE TRAVERSAL FOR SIP SIGNALING MESSAGES THROUGH TEMPORARY USE OF THE TCP TRANSPORT PROTOCOL

BACKGROUND (1) Field of the Invention

This invention relates to communication networks. More precisely, it pertains to the problem of transmitting signaling messages through address translation devices such as NAT ("Network Address Translation") devices.

(2) Description of Related Art

Current communication networks enable the establishment of communication sessions by means of signaling protocols such as H.323, MGCP (Media Gateway Control Protocol) or SIP (Session Initiation Protocol) and SDP (Session Description Protocol).

This SIP protocol is defined by RFC 3261 published by the IETF (Internet Engineering Task Force), and its dual purpose is:

to allow two parties to be brought into contact,
to enable the negotiation of the characteristics of the session to be established (video bitrate, which encoder (CODEC to use, etc.), via the SDP protocol.

The negotiation of session characteristics is specified by RFC 3264, entitled "SDP offer/answer model").

A calling party that wishes to call another party may send a signaling message ("Invite") to a signaling element, known as a "proxy", containing its personal address, the physical address of its terminal (or, more generally speaking, a client), and the personal address of the party being called. The signal element has means (the "registrar") for matching the personal address of the party being called with the physical address of the corresponding terminal. This matching allows the signaling message to be routed to the party being called.

If that party accepts the call, the party responds with new signaling messages that include the physical address of the terminal or client. In this manner, as both terminals know the physical address of the other party, they may establish an IP (Internet Protocol) connection for transmitting data (voice, video, etc.)

However, a problem arises with address translation devices, known as NAT ("Network Address Translation") or NAPT ("Network Address Port Translation") devices, which are defined in RFC 1631, *"The IP Network Address Translator"*, and in RFC 3022 *"Traditional IP Network Address Translator (Traditional NAT)"*. These devices are designed to interface a first network (typically, a private network) with a second network (such as the public Internet network).

The devices (terminals) of the first network have physical IP addresses whose validity is limited to that first network. When they wish to establish communications with devices located outside that first network, the address translation device assigns them a temporary second address, valid for the second network, and saves the association between the client's first and second addresses.

The NAT address translation device therefore modifies the messages transmitted between the two communication networks on the fly, by:

converting the terminals' first addresses into second addresses, within the IP headers of the outgoing messages, i.e. those being sent from the first network to the public second network, and by converting the terminals' second addresses into first addresses, within the IP headers of the incoming messages, i.e. those being sent from the second network to the first network.

An address translation device, i.e. a NAT device, therefore possesses a table used to match up the first and second addresses. These match-ups are temporary, and are deleted when the connection or session is terminated. These associations or match-ups are conventionally known as "binding".

A problem therefore arises when SIP/SDP signaling messages (or H.323 or others) traverse address translation devices. This problem is known as "NAT traversal".

Signaling protocols, such as SIP and SDP, are considered application protocols. The SIP/SDP protocol, for example may be transmitted via the TCP or UDP protocol, which themselves are located above IP in the protocol stack. An SIP message is therefore, in reality, a succession of parameters enclosed within a TCP or UDP message, which is itself enclosed within an IP message.

NAT address translation devices only edit the parameters found within the IP layer, leaving the parameters found within the higher-up layers intact.

In other words, the physical addresses contained within the SIP and SDP messages are not edited by the address translation devices, unlike the addresses contained within the IP headers.

As a result, the recipient of the signaling message (the client being called) will only know the first address of the calling client. However, as this address is only meaningful within the first network, no communication session can be established.

As this problem is well known, numerous solutions have been advanced to resolve it. There are two main approaches for resolving this problem: approaches based on the calling client, and approaches based on a server or device of the communication network.

The first category notably includes the STUN ("Simple Traversal of UDP through NATs") mechanism, described in RFC 3489. This mechanism allows a client (or terminal) to know its second address. In this manner, prior to a message being sent to the second communication network (for example, the public network), the calling client transmits a request to a STUN server located within this second network. This network replies with a message containing the address (and port) with which it "sees" the client, i.e. its second address.

The client may then use this second address to indicate, via the SDP protocol, which address it wishes to use[[s]] to receive replies.

However, this solution suffers from a major limitation, because numerous NAT devices are said to be "symmetrical" and bind a second address to a pair of parties. Additionally, the second address assigned to the client by the NAT device may be different for communication with the STUN server and for the session to be established with the other party. In a similar case, communication between the client and the other party cannot be established.

Other proposals, based on the same principle, have been made to improve the situation, such as TURN ("Traversal Using Relay NAT") mechanisms.

However, neither the STUN mechanism nor the TURN mechanism is suitable for the SIP protocol.

Additionally, a new mechanism, ICE ("Interactive Connectivity Establishment") has been proposed to make SIP signaling messages suitable for traversal. It is based on the STUN and TURN mechanisms, by adapting them.

The second category of solutions relies upon a device within the communication network. It should be noted that the earliest solutions implemented a server within the network (for example, a STUN server), but with the client having the initiative. In this second family of solutions, however, the initiative and implementation of NAT traversal solutions are both incumbent on a network device.

For example, a first solution belonging to this family is binding an application gateway to the NAT address translation device. This mechanism is known as ALG, for "Application Layer Gateway" or "Application-Level Gateway", and is defined is paragraph 2.9 of RFC 2663, entitled "*IP Network Address Translator (NAT) Terminology and Considerations*", published in August 1999.

This gateway (or a NAT device having the same functionalities of such a gateway) has means for understanding the application protocols used by the messages. In particular, it can understand the content of signaling messages, and translate the physical addresses contained within the SDP messages so that the parties may exchange their second addresses, rather than their first addresses, and may thereby establish communication sessions.

One variant of this solution consists of using a session controller, or SBC (for "Session Border Controller"), which will be located along the paths of the signaling messages. This type of product makes it possible to control the transmission of the communication sessions and signaling messages between both networks. More precisely, the SBC may play the role of an SIP "proxy" signaling element, which can control the means of transmitting media (a "media proxy") via a protocol such as Megaco, so that the communication sessions may be suitably established between the parties.

However, another technical problem arises in that the NAT address translation devices do not save the bindings within the first and second addresses after the connection or session is terminated.

The SIP signaling messages may be transported by the TCP (Transmission Control Protocol) or UDP (User Datagram Protocol) protocol. The TCP protocol saves an open connection until an action is taken to terminate the session. Additionally, if an SIP session using TCP is used, the NAT address translation device will save the binding until the TCP connection is terminated.

However, for the UDP protocol, no connection is established. Additionally, the NAT address translation device only saves the binding temporarily, i.e. until a predetermined length of time has expired.

Consequently, the use of the UDP protocol to transport an SIP signal raises significant problems for NAT address translation device traversal.

However, using the TCP protocol also raises problems, in that it requires the various participants to save open connections. In such a case, the server or proxy must keep saved as many open connections as there are SIP terminals, or clients, with which it is communicating.

As each TCP connection represents a significant quantity of contextual data, this is a significant burden for the SIP proxy. The designer of a communication network may also find himself faced with very tangible problems, such as the maximum limit of TCP connections that an operating system such as Linux can handle (65536 simultaneous connections).

Additionally, the majority of SIP architectures are currently based on the UDP transport protocol.

In order to remedy the temporary nature of the bindings between the first and second addresses, signaling messages are periodically transmitted between both parties for the sole purpose of keeping the binding active.

These signaling messages are usually "Register" messages of the SIP protocol, which include an "Expires" header containing the expiration value of the binding. This expiration period may be negotiated between the client and the server or proxy. For example, in the first "Register" message, the client indicates a first value. The server or proxy replies with a "200 Ok" message containing a second value in the "Expires" header. In accordance with the standard, the client must then use this second value as the expiration period: it will then send a "Register" message at regular intervals determined by this second value.

This approach is known as "UDP Hole Punching".

However, the TCP protocol has advantages which make it necessary for certain applications.

For example, when a message is large in size, the UDP protocol breaks it down into smaller datagrams, which may lead to fragmentation problems. The threshold is dependent on the communication network, and is determined by its maximum transmission unit (or MTU). This threshold is 1300 bytes for an Ethernet™ network.

As explained in paragraph 18.1.1. of RFC 3261, the UDP protocol may no longer be used once an SIP message has surpassed a size corresponding to this threshold minus a buffer value of 200 bytes. The TCP protocol (or another protocol enabling congestion control) must be used in such a case.

Consequently, neither the use of the UDP protocol nor of the TCP protocol is satisfactory, and there is a need for a solution that remedies the technical problems raised by both of the known solutions. The purpose of this invention is to propose such a solution.

SUMMARY

To that end, the first object of the invention is a method for establishing a communication session between a first communication client located within a first communication network, and a second communication client, by means of a signaling server located within a second communication network distinct from the first network and connected thereto via an address translation device.

This method consists of a step of binding a first address and a second address of the first communication client within the address translation device, by having said first communication client transmit registration messages to the communication server.

The method is characterized in that the signaling server:
saves an incoming signaling message sent from the second communication client and intended for the first communication client,
replies to the registration message that follows with a reply message requesting that the first communication client send a new registration message using the TCP protocol, and
delivers the incoming signaling message—which had previously been saved—after the new registration message has been received.

The first communication network may, for example, be a private network, and the second communication network, a public communication network.

The registration messages and the reply messages may be carried by the UDP protocol.

In one embodiment of the invention, the signaling server requests the sending of a new registration message using the TCP protocol, transmitting a "302 Moved Temporarily" message.

This "302 Moved Temporarily" message contains a "Contact" header containing a "Transport" parameter set to "TCP".

Finally, in one embodiment of the invention, the signaling message may be an initial message in accordance with the SIP protocol, chosen from among a group comprising the SIP signaling messages "Invite", "Subscribe", "Publish", "Refer" and "Message".

Another object of the invention is a signaling server comprising:
- a first interface for exchanging signaling messages with at least one communication client located within a first communication network distinct from a second communication network within which the signaling server is located, and connected to said server via an address translation device, and
- a second interface for transmitting signaling messages with other devices located within a second communication network.

The first interface is designed to receive registration messages sent from a communication client and intended to maintain the binding between a first address and a second address of the communication client within the address translation device.

This communication server is characterized in that:
- it further comprises a memory for saving an incoming signaling message sent from the second interface to the communication client, and in that
- the first interface is designed so that, after an incoming signaling message arrives, it replies to the registration message that follows with a reply message requesting that the communication client send a new registration message using the TCP protocol, and then delivers the incoming signaling message (which had previously been saved) following then receipt of this new registration message.

Finally, a third object of the invention is an IMS ("IP Multimedia Subsystem") architecture comprising at least one CSCF ("Call Session Control Function") functional element implementing such a communication server.

In this manner, a TCP connection is only established when necessary, and it is not necessary to simultaneously keep one TCP connection active for every communication session. Thus, the problems posed by an excess of TCP connections does not arise, but the insufficiencies related to the UDP protocol are resolved by establishing a TCP connection "on demand".

The only drawback to the inventive solution is the potential delay created by saving the incoming signaling messages until the TCP connection is established. This delay is determined by the refresh time.

BRIEF DESCRIPTION OF THE DRAWINGS

The invention, its characteristics, and its benefits will become apparent in the following description, in connection with the attached figures.

DETAILED DESCRIPTION OF EXAMPLE EMBODIMENTS

Figure 1:
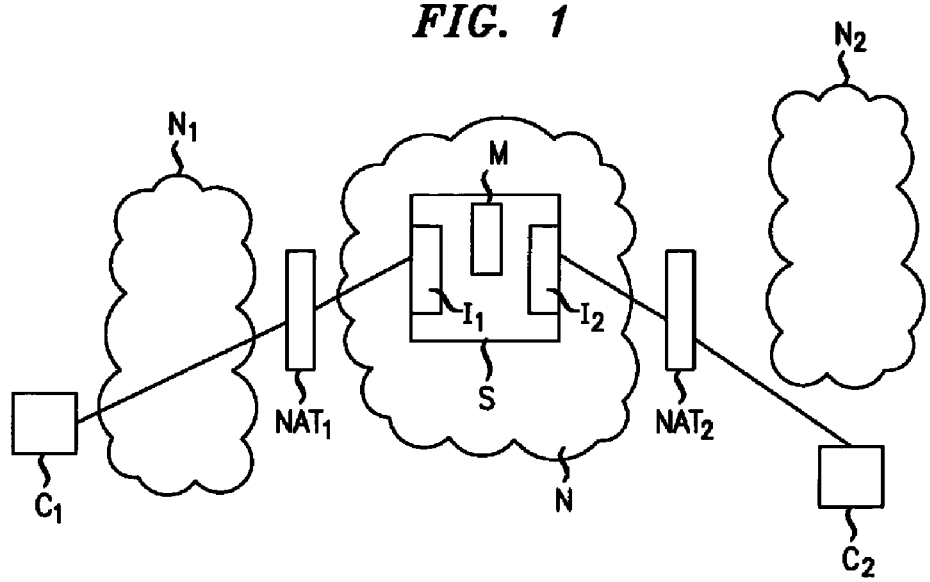
FIG. 1 depicts an architecture wherein the inventive signaling server may be deployed.

In the example network architecture depicted in FIG. 1, two communication clients $C_1$ and $C_2$ are connected to a communication network N. The communication client $C_1$ belongs to a first communication network $N_1$, which is connected to a second communication network N via an address translation device $NAT_1$.

The communication client $C_1$ possesses a first address that may be used within the first communication network $N_1$: it may use this first address to communicate with devices belonging to this first network (including the device $NAT_1$), but not with outside devices. To communicate with these outside devices, a second address is temporarily assigned to it by the address translation device $NAT_1$.

This address translation device $NAT_1$ thus maintains a binding between the first address of the client $C_1$ and its second address. The messages sent from or to this client $C_1$ are analyzed, and the first addresses are translated into second addresses, and vice versa.

The first communication network may, for example, be a private communication network, and the second communication network may be a public network.

The communication client $C_1$ may connect to the communication client $C_2$ via a signaling server S. This signaling server is typically an SIP proxy server. With an IMS (IP Multimedia Subsystem) architecture as specified by the 3GPP or TISPNA standards organizations, this server or proxy server may be a CSCF (Call Session Control Function) element.

The signaling server S may also be an SGC (Session Border Controller).

In the following description, only the connection between the client $C_1$ and the signaling server is primarily dealt with. The connection between the client $C_2$ and the server S is thus not described in detail.

The example depicted in FIG. 1 represents one highly simplified embodiment, for the purpose of better understanding the invention. In this manner, the communication client $C_2$ belongs to a third network $N_2$, connected to the second communication network N via a second address translation device $NAT_2$.

In an actual deployment, other devices may exist between the signaling server S and the communication client $C_2$. The communication client $C_2$ may, for example, be connected to another signaling server, and both signaling servers may communicate directly or through other servers.

The example given in FIG. 1, however, makes it possible to understand the invention, without departing from its spirit, but also without focusing on devices which play no direct role in the invention.

In order to bind the first and second addresses, the communication client $C_1$ transmits registration messages to the signaling server S. These messages are typically transmitted periodically, potentially after negotiation.

Figure 2:
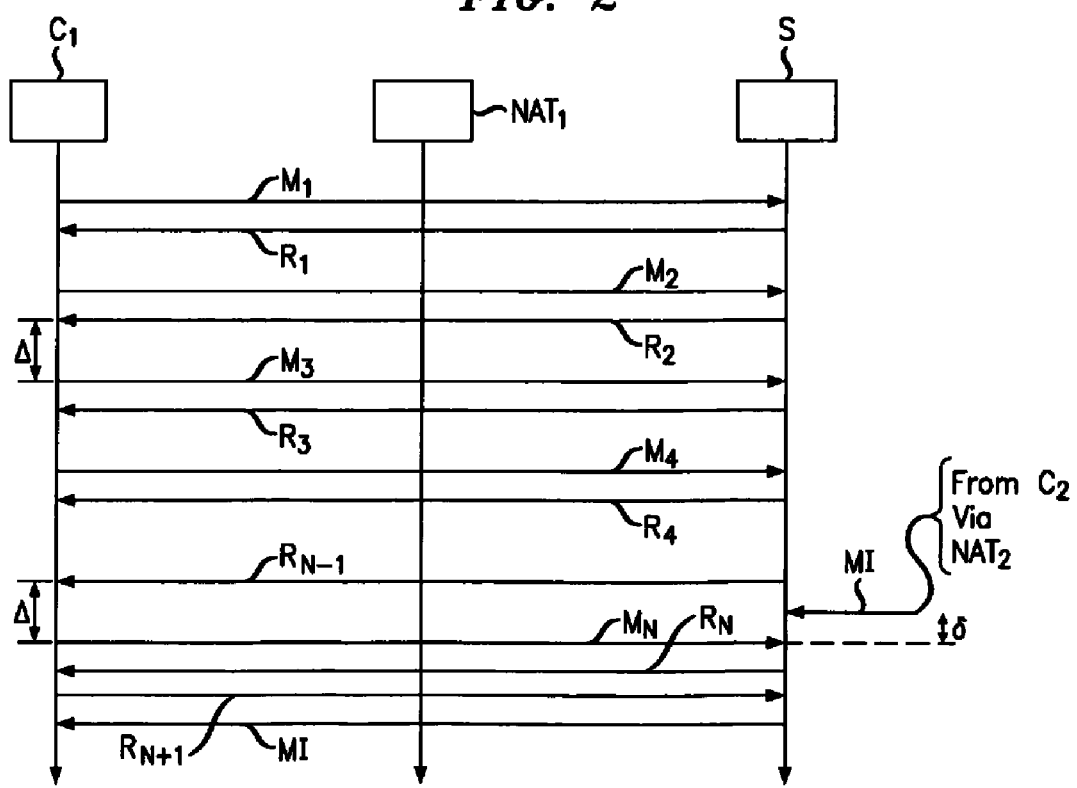
FIG. 2 depicts a diagram of an example dialogue that may be implemented between a communication client and the inventive signaling server.

FIG. 2 diagrams the exchange between the client $C_1$ and the signaling server S. Each vertical axis represents a network element, respectively $C_1$, the address translation device $NAT_1$, and the signaling server S. The time increases as the lines move downward. The horizontal arrows represent the signaling messages exchanged between these elements.

The registration message $M_1$ is the initial registration message. It specifies a first value for the refresh time. This first value may be high, e.g. 3600 seconds.

The signaling server S responds with a reply message $R_1$, which may contain a second value, e.g. 30 seconds.

The client $C_1$ may then use this second value as a basis, transmitted within the reply message $R_1$. In the absence of a second value, it uses the first value, which it previously determined by itself, as a basis.

With an interval Δ corresponding to this refresh time value determined in this manner, the communication client $C_1$ transmits a signaling message $M_2, M_3, M_4 \ldots$ to the signaling server 5, which responds to it with reply messages, respectively $R_2, R_3, R_4 \ldots$.

The signaling server has an interface $I_1$ designed to receive these registration messages and to respond with a reply message.

These registration messages may be "Register" message that comply with the SIP protocol. The refresh time may be contained within the "Expire" header of these messages. The reply messages may be "200 OK" messages of the SIP protocol, and the refresh time, if any, may be contained within an "Expire" header.

All of these registration messages $M_1, M_2, M_3, M_4 \ldots$ and reply messages $R_1, R_2, R_3, R_4 \ldots$ are carried by the UDP protocol. In a "Via" header, the registration messages specify that the transport protocol must be UDP.

This sort of Via header may look like:
Via: SIP/2.0/TCP client.a.example.com:5620; branch=z9hG4bK74bf9

The signaling server S therefore does not keep any TCP connection open to handle the connection with the client $C_1$.

At a given moment, the signaling server S may receive an incoming signaling message MI sent from the second communication client $C_2$. This may be an "initial" signaling message in accordance with the SIP protocol, such as an "Invite", "Subscribe", "Publish", "Refer", or "Message" message. The purpose of the "Invite" message is to invite the communication client $C_1$ to accept the establishment of a communication session with the calling communication client $C_2$.

This communication may require the use of the TCP protocol.

It is possible that these requests may be systematic, and that every invitation sent from a client $C_2$ may lead to the creation of a TCP connection to carry the session to be established.

It is also possible that choice may be made between the TCP protocol and the UDP protocol. This choice may be determined by a parameter within this incoming signaling message MI. This parameter may be inserted into the "contact" header, in accordance with the SIP protocol.

The choice may also be determined by the signaling server S, potentially by taking into account the parameter(s) inserted into the incoming signaling message MI.

Assume that the communication session requires the use of the TCP transport protocol.

The incoming signaling message is received by an interface I2 of the signaling server S and is temporarily saved within a memory M. After sending a reply message $R_{N-1}$, the signaling server S awaits the registration message $M_N$ that follows. The wait time δ for processing the incoming signaling message MI is therefore less than the refresh time Δ.

The server S responds to the registration message $M_N$ with a reply message $R_N$ requesting that the communication client $C_1$ send a new registration message using the TCP protocol.

In one embodiment, this reply message may be a "302 Moved Temporarily" message in accordance with the SIP protocol.

This type of message contains a "Contact" header specifying the new URI (Universal Resource Identifier) of the host to be contacted. It also contains a parameter specifying the transport protocol with which the host must be contacted.

This parameter may be the "Transport" parameter as defined by RFC 3261 in section 20.10

A "Contact" header may, for example, look like:
Contact: <sip:bob@192.0.2.4; transport=UDP>;expires=60

Within the context of the invention, this does not serve as a true change of address, and therefore this header contains the address of the signaling server S. The value of the parameter specifying the transport protocol is "TCP".

Thus, the use of the "302 Moved Temporarily" message type makes it possible to transmit the needed information without requiring that a new type of message be added to the existing SIP protocol.

This reply message $R_N$ causes a new registration message $M_{N+1}$ to be sent using the TCP protocol.

This new registration message may be transmitted immediately following the receipt of the reply message $R_N$, i.e. without waiting for the refresh time Δ to expire as before. This makes it possible to reduce latency times for processing the incoming signaling message MI.

The registration message $M_{N+1}$ enables the opening of a TCP connection between the communication client C1 and the signaling server S, through the address translation device $NAT_1$.

Once the TCP connection has been established, the signaling server can deliver the signaling message MI to the recipient communication client $C_1$. It may then be deleted from the memory M of the signaling server S.

When the communication session is terminated (for example, one of the two communication clients hangs up), the signaling server may transmit a termination message to the communication client $C_1$.

The TCP connection may then be terminated.

The communication client $C_1$ may then resume transmitting the registration messages carried by the UDP protocol with a frequency of Δ, in order to maintain the binding within the address translation device $NAT_1$.

As seen above, the TCP connection meets the needs of certain TCP protocol applications.

Furthermore, it enables the transmission of the incoming signaling message MI which would otherwise be impossible. Indeed, certain address translation devices have a firewall function. They do not enable the transmission of messages sent from the public network N, unless they are replies to a message sent from the first network $N_1$ or as part of a TCP connection.

In such cases, the establishment of a TCP connection makes it possible to transmit the invitation message MI through the firewall $NAT_1$. The invention therefore resolves this additional technical problem.

As a result of the invention, a TCP connection is only opened during a communication session. The rest of the time, i.e. when a communication client is only waiting but is available to send to receive invitation messages, an ordinary UDP protocol exchange makes it possible to keep the connection with the signaling server.

The invention therefore makes it possible to optimize the use of the UDP and TCP protocols in order to benefit from their respective advantages, under the SIP protocol.

The invention claimed is:

1. A method for establishing a communication session between a first communication client located within a first communication network, and a second communication client, via a signaling server located within a second communication network distinct from said first communication network and connected thereto via a address translation device, including a step of binding a first address and a second address of said first communication client within said address translation device, by having said first communication client transmit registration messages according to the UDP protocol to the communication server, said method comprising:

saving, at the communication server, an incoming signaling message sent from the second communication client and intended for the first communication client, replying, by the communication server, to the registration message from the first communication client that follows the saved incoming message with a reply message requesting that the first communication client send a new registration message using the TCP protocol, and delivering, by the communication server, said incoming signaling message to the first communication client after said new registration message using the TCP protocol has been received by the communication server.

2. A method according to claim 1, wherein said first communication network is a private network, and said second communication network is a public communication network.

3. A method according to claim 1, wherein said reply messages are carried by the UDP protocol.

4. A method according to claim 1, wherein said signaling server requests that a new registration message be sent using the TCP protocol, transmitting a "302 Moved Temporarily" message.

5. A method according to the preceding claim 4, wherein said "302 Moved Temporarily" message contains a "Contact" header containing a "Transport" parameter set to "TCP".

6. A method according to claim 1, wherein said signaling message is an initial message in accordance with the SIP protocol and chosen from among a group comprising "Invite", "Subscribe", "Publish", "Refer" and "Message".

7. A signaling server comprising:

a first interface configured to exchange signaling messages with at least one communication client located within a first communication network distinct from a second communication network within which said signaling server is located, the first interface connected to said signaling server via an address translation device said first interface being designed to receive registration messages sent from a communication client and intended to bind a first address and a second address of said communication client within said address translation device;

a second interface configured to transmit signaling messages with other devices located within said second communication network; and a memory configured to save an incoming signaling message, sent from said second interface and to said communication client; and wherein said first interface is designed so that, following the arrival of one of said incoming signaling messages, the first interface responds to a UDP protocol registration message from the communication client with a reply message requesting that said communication client send a new registration message using the TCP protocol, and the first interface then delivers said incoming signaling message to the communication client following the receipt of said new registration message using the TCP protocol from the communication client.

8. A signaling server according to claim 7, wherein said first communication network is a private network, and said second communication network is a public communication network.

9. A signaling server according to claim 7, wherein said reply messages are carried by the UDP protocol.

10. A signaling server according to claim 7, wherein said first interface is designed to request that a new registration message be sent using the TCP protocol, transmitting a "302 Moved Temporarily" message.

11. A signaling server according to claim 10, wherein said "302 Moved Temporarily" message contains a "Contact" header containing a "Transport" parameter set to "TCP".

12. A signaling server according to claim 7, wherein said signaling message is an initial message in accordance with the SIP protocol and chosen from among a group comprising "Invite", "Subscribe", "Publish", "Refer" and "Message".

* * * * *